(12) United States Patent
Li

(10) Patent No.: US 11,995,492 B1
(45) Date of Patent: May 28, 2024

(54) ELECTRONIC TAG DEVICE WITH ELECTROPHORETIC DISPLAY

(71) Applicant: Bing xuan Li, Hsinchu (CN)

(72) Inventor: Bing xuan Li, Hsinchu (CN)

(*) Notice: Subject to any disclaimer, the term of this patent is extended or adjusted under 35 U.S.C. 154(b) by 0 days.

(21) Appl. No.: 18/519,906

(22) Filed: Nov. 27, 2023

(51) Int. Cl.
*G06K 19/07* (2006.01)
*G06K 19/077* (2006.01)

(52) U.S. Cl.
CPC ... *G06K 19/0723* (2013.01); *G06K 19/07703* (2013.01)

(58) Field of Classification Search
CPC .............. G06K 19/0723; G06K 19/07703
USPC ........................................... 235/492
See application file for complete search history.

(56) References Cited

U.S. PATENT DOCUMENTS

| | | |
|---|---|---|
| 11,605,876 B1 | 3/2023 | Li |
| 11,640,511 B1 | 5/2023 | Li |
| 11,758,392 B1 | 9/2023 | Li |
| 11,836,738 B1 * | 12/2023 | Johnson ............... B60Q 1/5035 |
| 2019/0381957 A1 * | 12/2019 | Umoh ..................... B60Q 1/509 |
| 2020/0254926 A1 * | 8/2020 | Golduber ................ G09F 9/372 |
| 2021/0050653 A1 * | 2/2021 | Lee ......................... G06F 1/1633 |
| 2021/0097465 A1 * | 4/2021 | Rao .......................... H04W 4/46 |
| 2021/0227366 A1 * | 7/2021 | Shuman ................ H04W 24/08 |
| 2021/0296764 A1 * | 9/2021 | Shams ...................... H01Q 3/385 |
| 2022/0393341 A1 * | 12/2022 | Shams .................... H01Q 21/28 |
| 2023/0382320 A1 * | 11/2023 | Clark ..................... B60R 13/105 |
| 2023/0394997 A1 * | 12/2023 | Bennett ................. B60R 13/105 |

* cited by examiner

*Primary Examiner* — Allyson N Trail
(74) *Attorney, Agent, or Firm* — Zhigang Ma

(57) ABSTRACT

An electronic tag device with electrophoretic display includes: a front frame, a display screen disposed on a side of the front frame, a middle frame disposed on a side of the display screen facing away from the front frame, a circuit board disposed on a side of the middle frame facing away from the display screen, and a rear frame disposed on a side of the circuit board facing away from the middle frame. The display screen is configured to display target information under a control of the circuit board. The circuit board is provided with a processor, a memory and a RFID tag circuit connected to the processor; the memory stores multiple sets of tag data, and the processor is configured to select a target set of tag data from the multiple sets of tag data, and transmit the target set of tag data to the RFID tag circuit.

20 Claims, 5 Drawing Sheets

United States Patent US 11,995,492 B1

ELECTRONIC TAG DEVICE WITH ELECTROPHORETIC DISPLAY

TECHNICAL FIELD

The disclosure relates to the field of display technologies, in particularly to an electronic tag device with electrophoretic display.

BACKGROUND

Vehicles, as a kind of transportation, are widely used in people's lives. License plates of the vehicle, also referring to vehicle number plates, are hung on front and back of the vehicle respectively. The license plate reflects registration information of each vehicle, and an area, an owner and registration information of the vehicle can be obtained according to the license plate.

However, the existing license plate has a single function and only displays license plate number, which cannot meet people's life and work needs.

SUMMARY

The disclosure provides an electronic tag device with electrophoretic display, the electronic tag device with electrophoretic display can be used as a digital license plate of a vehicle, which can enrich functions of the license plates in the related art and meet the actual life and work needs of users.

The disclosure provides the electronic tag device with electrophoretic display, including: a front frame, a display screen, a middle frame, a circuit board, and a rear frame; the display screen is disposed on a side of the front frame, a middle frame is disposed on a side of the display screen facing away from the front frame, a circuit board is disposed on a side of the middle frame facing away from the display screen, and a rear frame is disposed on a side of the circuit board facing away from the middle frame; the display screen is configured (i.e., structured and arranged) to display target information under a control of the circuit board; and the circuit board is provided with a processor, a memory connected to the processor, and a radio frequency identification (RFID) tag circuit connected to the processor; the memory stores multiple sets of tag data, and the processor is configured to select a target set of tag data from the multiple sets of tag data stored in the memory, and transmit the target set of tag data to the RFID tag circuit.

In an embodiment, the electronic tag device with electrophoretic display further includes: a heater and a heat sink; the heater is disposed between the display screen and the middle plate; and the heat sink is disposed between the heater and the middle plate.

In an embodiment, the electronic tag device with electrophoretic display further includes: a sensor, configured to monitor a temperature of the display screen and send, in response to the temperature of the display screen being greater than a target temperature, a control signal to the processor; and the processor is configured to turn on the heat sink in response to the control signal.

In an embodiment, the electronic tag device with electrophoretic display is a digital license plate for a vehicle, and the target information includes alphanumeric characters.

In an embodiment, the electronic tag device with electrophoretic display further includes: a license plate holder disposed on a side of the rear plate facing away from the circuit board and configured to fix to the vehicle.

In an embodiment, the display screen is configured to display the target information including a first license plate number of the vehicle; and the processor is configured to obtain a second license plate number from prestored license plate numbers and control the display screen to display the second license plate number different from the first license plate number.

In an embodiment, the circuit board is further provided with a cellular communication circuit connected to the processor, and a positioning circuit connected to the cellular communication circuit; the positioning circuit is configured to obtain current positional data of the electronic tag device with electrophoretic display and transmit the current positional data to the cellular communication circuit; the cellular communication circuit is configured to receive the current positional data, wirelessly transmit the current positional data to a server to thereby enable the server to output an information updating instruction in response to a current geographical region where the electronic tag device with electrophoretic display is located determined by the current positional data is different from a previously determined geographical region, wirelessly receive the information updating instruction from the server, and transmit the information updating instruction to the processor; and the processor is configured to obtain, in response to the information updating instruction, the second license plate number from the prestored license plate numbers and control the display screen to display the second license plate number corresponding to current geographical region.

In an embodiment, the circuit board is further provided with a cellular communication circuit connected to the processor; the cellular communication circuit is configured to receive a control instruction from a server and transmit the control instruction to the processor; and the control instruction is generated by the server based on control information output by a mobile terminal; and the processor is configured to control, in response to the control instruction, the target information to flashing display.

In an embodiment, the display screen is specifically configured to display the target information including a quick response (QR) code.

In an embodiment, the electronic tag device with electrophoretic display further includes: a charging pile connector, detachably connected to a side of the electronic tag device with electrophoretic display and configured to connect a charging pile to the electronic tag device with electrophoretic display.

In an embodiment, the circuit board is further provided with a cellular communication circuit connected to the processor, and a positioning circuit connected to the cellular communication circuit; the positioning circuit is configured to obtain current positional data of the electronic tag device with electrophoretic display and transmit the current positional data to the cellular communication circuit; the cellular communication circuit is configured to receive the current positional data, wirelessly transmit the current positional data to a server to thereby enable the server to output a tag data updating instruction in response to a current geographical region where the electronic tag device with electrophoretic display is located determined by the current positional data is different from a previously determined geographical region, wirelessly receive the tag data updating instruction from the server, and transmit the tag data updating instruction to the processor; and the processor is configured to obtain the target set of tag data corresponding to the tag data updating instruction from the multiple sets of tag data stored in the memory and transmit the target set of tag data to the RFID tag circuit for tag data updating.

In an embodiment, the cellular communication circuit is specifically configured to: receive the current positional data, encrypt the current positional data, and wirelessly transmit the encrypted current positional data to the server; and the cellular communication circuit is specifically configured to: wirelessly receive the tag data updating instruction after being encrypted by the server, decrypt the received tag data updating instruction, and transmit the decrypted tag data updating instruction to the processor.

In an embodiment, each set of the multiple sets of tag data includes: an electronic product code (EPC) and a tag identifier (TID).

In an embodiment, the TIDs of the multiple sets of tag data include multiple account information corresponding to different geographical regions respectively, and the TID of the target set of tag data includes one of the multiple account information corresponding to the current geographical region being one of the different geographical regions.

In an embodiment, the circuit board is further provided with a BLUETOOTH communication circuit connected to the processor; and the BLUETOOTH communication circuit has a first mode and a second mode; and the BLUETOOTH communication circuit is configured to wirelessly connect an OBD device connected to a vehicle in the first mode, and to wirelessly connect a mobile terminal in the second mode.

In an embodiment, the processor is configured to transmit an OBD data request command set to the BLUETOOTH communication circuit; the BLUETOOTH communication circuit is configured to output, in the first mode, the OBD data request command set to the vehicle through the OBD device, to thereby enable the vehicle to output OBD data in response to the OBD data request command set; and the processor is further configured to obtain first target OBD data based on the OBD data obtained from the OBD device through the BLUETOOTH communication circuit and convert a data format of the first target OBD data to obtain converted first target OBD data meeting ISO18000-6C; and the RFID tag circuit is configured to obtain and store the converted first target OBD data meeting ISO18000-6C from the processor to thereby allow a first server to obtain the converted first target OBD data meeting ISO18000-6C from the RFID tag circuit.

In an embodiment, the OBD data includes: static data including vehicle identification number (VIN), and dynamic data including at least one of a fuel tank level, odometer data and vehicle exhaust emission parameters.

In an embodiment, the circuit board is further provided with a cellular communication circuit connected to the processor and configured to wirelessly connect a second server; and the processor is further configured to obtain second target OBD data based on the OBD data, and transmit the second target OBD data to the cellular communication circuit to thereby allow the second server to obtain the second target OBD data from the cellular communication circuit.

In an embodiment, the processor is further configured to obtain third target OBD data based on the OBD data, and transmit the third target OBD data to the BLUETOOTH communication circuit to thereby allow the mobile terminal to obtain the third target OBD data from the BLUETOOTH communication circuit in the second mode for user viewing.

In an embodiment, the processor is configured to obtain data to be displayed from the memory, and transmit the data to be displayed to the BLUETOOTH communication circuit; and the BLUETOOTH communication circuit is configured to receive the data to be displayed, convert the data to be displayed and then output, in the second mode, the converted data to be displayed to the mobile terminal for user viewing.

Beneficial effects of the disclosure are as follows.

The electronic tag device with electrophoretic display can be used not only as a tag device, but also as a digital license plate. As the digital license plate, its display screen can display a variety of information and realize information update, which enriches the functions of the existing license plates. In addition, as the tag device, the electronic tag device enriches the functions of the existing tag devices and is suitable for various application scenes. The electronic tag device with electrophoretic display can meet the needs of different users In a first aspect, the electronic tag device with electrophoretic display can store multiple license plate numbers corresponding to different geographic regions respectively, the electronic tag device with electrophoretic display can obtain a license plate number from the multiple license plate numbers to replace the previously displayed license plate number when the geographical region of the electronic tag device with electrophoretic display has changed. Therefore, the electronic tag device with electrophoretic display is disposed on the vehicle as the digital license plate, the electronic tag device with electrophoretic display can achieve automatic updating of the license plate number, with simple and convenient operation, which can avoid the tedious operation of manually replacing the license plate when the geographical region of the vehicle has changed.

In a second aspect, the electronic tag device with electrophoretic display can receive a control instruction from a server and control, in response to the control instruction, the target information to flashing display. For example, when a vehicle is stolen, the owner can send control information to the server through communication with the server, the server sends the control instruction to the electronic tag device with electrophoretic display based on the received control information, and the electronic tag device with electrophoretic display controls the target information to flashing display based on the control instruction, thereby reminding surrounding people that the vehicle is abnormal.

In a third aspect, the electronic tag device with electrophoretic display can display QR code. The QR code, for example, is used for payment, making it suitable for various scenes, allowing the driver to achieve contactless payment.

In a fourth aspect, the electronic tag device with electrophoretic display can store multiple sets of tag data corresponding to different geographic regions respectively, acquire the positional data in real time or periodically and transmit the positional data to the server, the server can output the tag data updating instruction when it determines that the current geographical region where the electronic tag device with electrophoretic display is located determined by the positional data is different from a previously determined geographical region, i.e., the geographical region of the electronic tag device with electrophoretic display has changed, the electronic tag device with electrophoretic display can obtain the target set of tag data corresponding to the tag data updating instruction from the multiple sets of tag data to complete tag data updating. Therefore, the electronic tag device with electrophoretic display is disposed on a vehicle, which can save an additional expense for toll settlement caused by an existing tag device of the vehicle being bound with only one account information. It is conducive to the development of the car leasing industry.

In a fifth aspect, the processor of the electronic tag device with electrophoretic display can obtain the target OBD data based on the OBD data obtained from the vehicle, therefore the electronic tag device with electrophoretic display is not only used for the toll collection without stopping, but also can be used in the variety of application scenes because the OBD data can be obtained. In an application scene, the processor of the electronic tag device with electrophoretic display can convert the target OBD data, the RFID tag circuit can store the converted target OBD data, the server can obtain the converted target OBD data through the RFID tag circuit, the server may be the authenticated electronic toll collection (ETC) server and the converted target OBD data may include vehicle exhaust data, the authenticated ETC server can obtain the vehicle exhaust data from the RFID tag circuit, therefore it is convenient for relevant departments such as traffic management department or environmental protection department to monitor the carbon emissions of the vehicles, and it is beneficial for the relevant departments to manage vehicles. In another application scene, the target OBD data may include vehicle basic parameters such as a fuel consumption, a driving distance, an odometer data, and a fuel tank level; in the logistics company, when a vehicle driver e.g., a truck driver drives the truck disposed with the electronic tag device with electrophoretic display, the logistics company can know driving conditions of the truck based on the target OBD data, and thus it can avoid the problem of the truck driver stealing fuel such as gasoline on the way, and the transportation cost of the logistics company can be reduced. In a still another application scene, the target OBD data may include vehicle fault diagnosis data, vehicle maintenance personnel can directly obtain the vehicle fault diagnosis data for vehicle fault diagnosis and vehicle maintenance, the operation of obtaining data is simple and efficient. The electronic tag device with electrophoretic display can obtain the target OBD data based on the OBD data, and output the target OBD data through the RFID tag circuit, the cellular communication circuit and/or the BLUETOOTH communication circuit, thereby to meet actual needs, and the application scope of the electronic tag device with electrophoretic display is wider.

BRIEF DESCRIPTION OF DRAWINGS

In order to more clearly explain embodiments of the disclosure or the technical schemes in the prior art, the following will briefly introduce the drawings that need to be used in the description of the embodiments or the prior art. It is obvious that the drawings in the following description are only some of the embodiments of the disclosure. For those skilled in the art, other drawings can be obtained according to the structure shown in these drawings without paying creative work.

A realization of purposes, functional characteristics and advantages of the disclosure will be further described with reference to the attached drawings in combination with some embodiments.

DETAILED DESCRIPTION OF EMBODIMENTS

The technical schemes in the embodiments of the disclosure will be clearly and completely described below in combination with the drawings in the embodiments of the disclosure. Apparently, the described embodiments are only some of the embodiments of the disclosure, not all of them. Based on the embodiments in the disclosure, all other embodiments obtained by those skilled in the art without creative work should be within the scope of the disclosure.

In the disclosure, unless specific provisions and limitations, the terms "connect", "dispose" and etc., should be understood in a broad sense. For example, the term "connect" can be directly connected, indirectly connected through an intermediate medium, fixedly connected, a detachably connected, integrated into one, or electrically connected. It can be a connection within two elements or an interactive relationship between the two elements, unless the specific provisions and limitations, for those skilled in the art, the specific meaning of the above terms in the disclosure can be understood according to the specific situation.

In addition, the technical schemes among various embodiments can be combined with one another, but it must be based on the realization of those skilled in the art. When the combination of technical schemes is contradictory or impossible, it should be considered that the combination of technical schemes does not exist and is not within the protection scope of the disclosure.

Figure 1A:
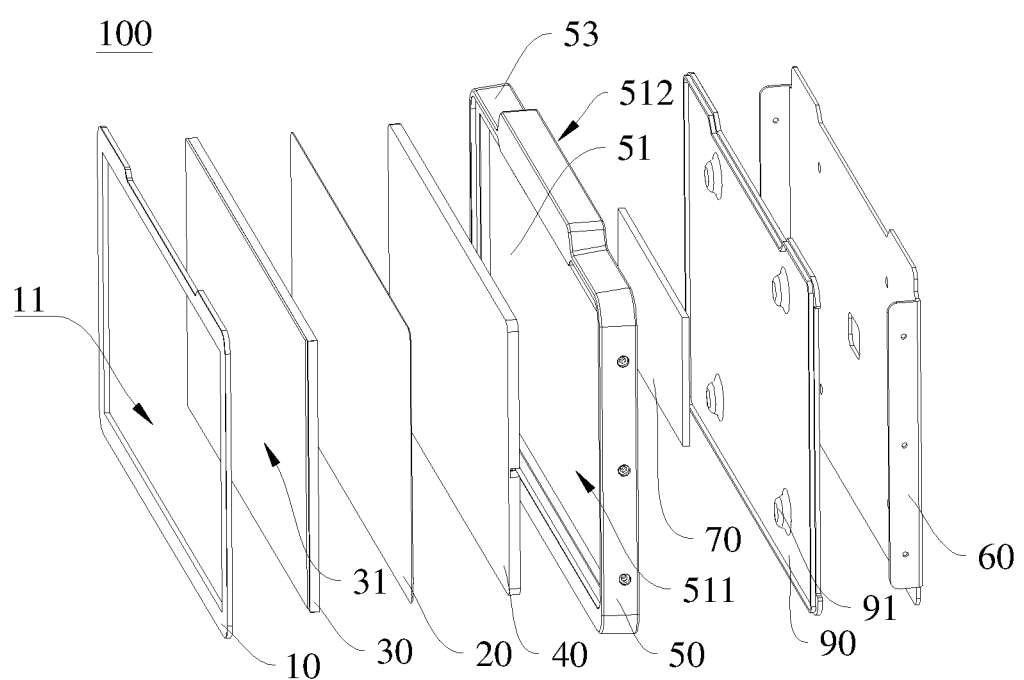
FIG. 1A illustrates an exploded view of an electronic tag device with electrophoretic display without a charging pile connector according to an embodiment of the disclosure.
Figure 1B:
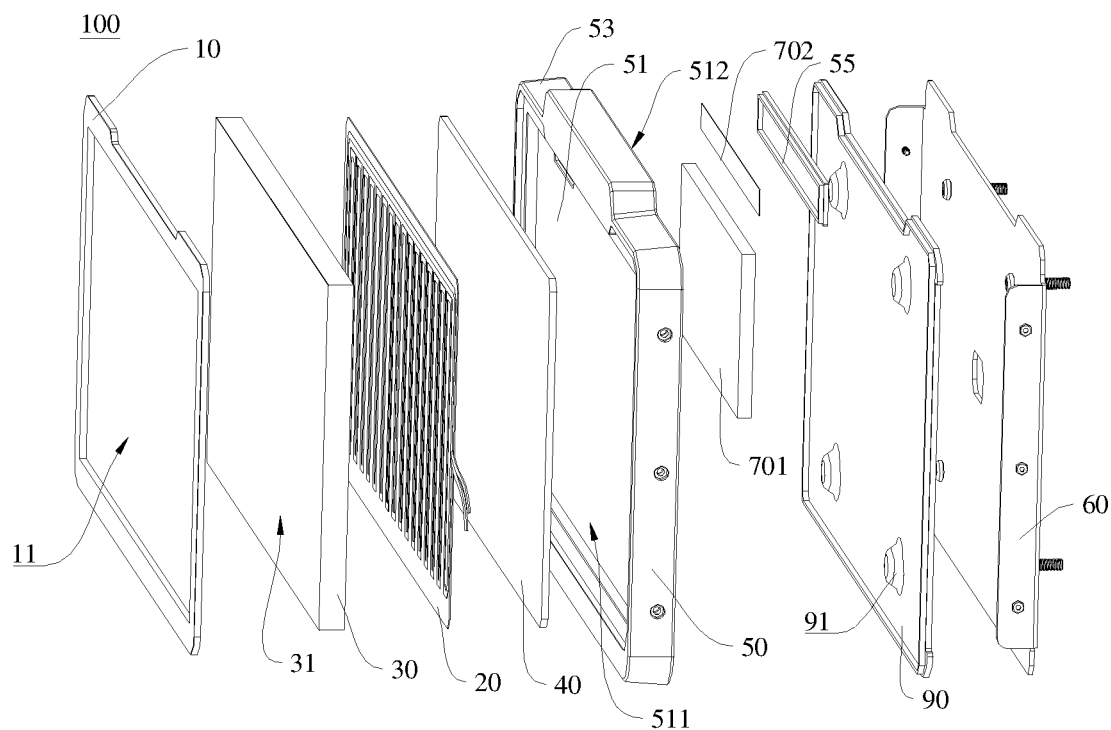
FIG. 1B illustrates another exploded view of an electronic tag device with electrophoretic display without a charging pile connector according to an embodiment of the disclosure.

An embodiment of the disclosure provides an electronic tag device with electrophoretic display 100, and as shown in FIG. 1A and FIG. 1B, the electronic tag device with electrophoretic display 100 may include: a front frame 10, a display screen 30, a middle frame 50, a circuit board 70, and a rear frame 90.

The display screen 30 is disposed between the front frame 10 and the middle frame 50, the middle frame 50 is disposed on a side of the display screen 30 facing away from the front frame 10, the circuit board 70 is disposed on a side of the middle frame 50 facing away from the display screen 30, and a rear frame 90 is disposed on a side of the circuit board 70 facing away from the middle frame 50.

In some embodiments, the display screen 30 is configured (i.e., structured and arranged) to display target information under a control of the circuit board 70. The display screen 30 may be an electrophoretic display screen, such as an E-ink display screen. The target information may include: alphanumeric characters, pictures, texts, and/or quick response (QR) codes.

Figure 5:
FIG. 5 illustrates a schematic diagram of a display screen displaying target information of the electronic tag device with electrophoretic display according to an embodiment of the disclosure.

In an embodiment, the electronic tag device with electrophoretic display may be a digital license plate for a vehicle, and the target information may include the license plate number of the vehicle. For example, as shown in FIG. 5, a display area 31 of the display screen 30 may display the target information including the date, place and license plate number of the vehicle.

The disclosure does not limit the specific type of the display screen 30, which can also be a light-emitting diode (LED) display screen, or an organic light-emitting diode (OLED) display screen, etc.

In some embodiments, as shown in FIG. 1A and FIG. 1B, the front frame 10 may include a hollow area 11 corresponding to the display area 31 of the display screen 30, and the display area 31 of the display screen 30 can display the target information and/or other information. The middle frame 50 may include an inner plate 51 and an outer frame 53, the outer frame 53 surrounds the inner plate 51, the inner plate 51 forms a first installation area 511 and a second installation area 512 at two sides, the first installation area 511 is used to install the display screen 30, and the second installation area 512 is used to install the circuit board 70. The rear frame 90 may include multiple protrusions 91 configured to limit positions.

The front frame 10, the middle frame 50, and the rear frame 90 may be rectangular frames, but the disclosure is not limit to this, and the front frame 10, the middle frame 50, and the rear frame 90 with other shape can also be used.

In some embodiments, as shown in FIG. 1A and FIG. 1B, the electronic tag device with electrophoretic display 100 further includes: a heater 20 and a heat sink 40. The heater 20 is disposed between the display screen 30 and the middle plate 50. The heat sink 40 is disposed between the heater 20 and the middle plate 50. That is, in the direction shown in FIG. 1A, the front frame 10, the display screen 30, the heater 20, the heat sink 40 and the middle frame 50 are sequentially arranged from left to right in that order.

Figure 3:
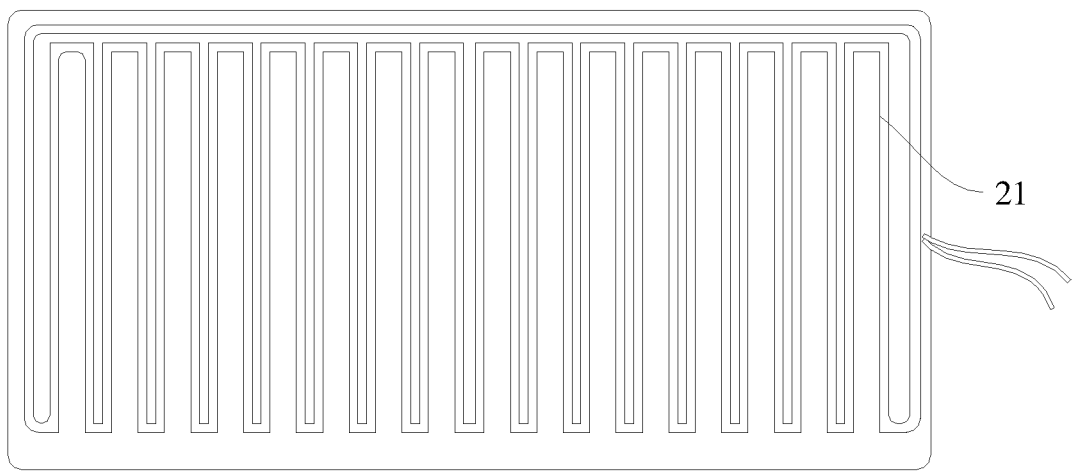
FIG. 3 illustrates a schematic structural diagram of a heater of the electronic tag device with electrophoretic display according to an embodiment of the disclosure.

In an illustrated embodiment, as shown in FIG. 3, the heater 20 may be a flexible print circuit heater, and the heater 20 may include lines 21 which can be electrified to generate heat.

Figure 4:
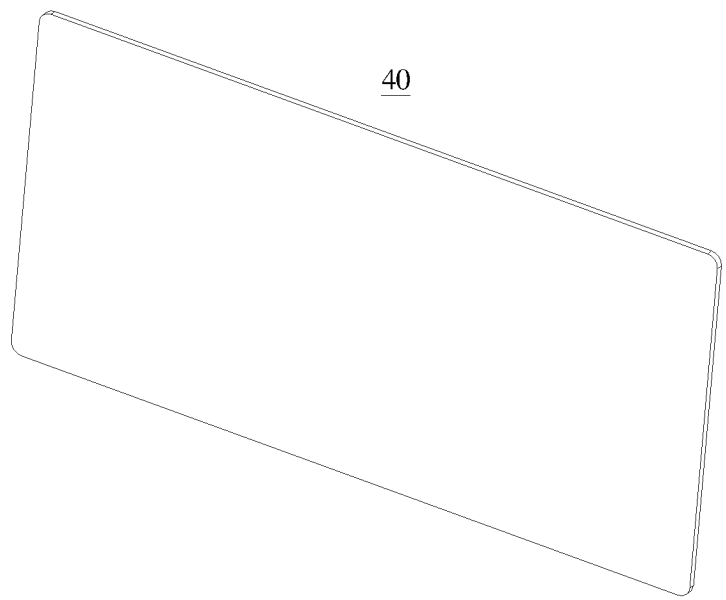
FIG. 4 illustrates a schematic structural diagram of a heat sink of the electronic tag device with electrophoretic display according to an embodiment of the disclosure.

In an illustrated embodiment, as shown in FIG. 4, the heat sink 40 may be a copper cooling heat sink, that is, the heat sink 40 is made of copper.

Figure 2:
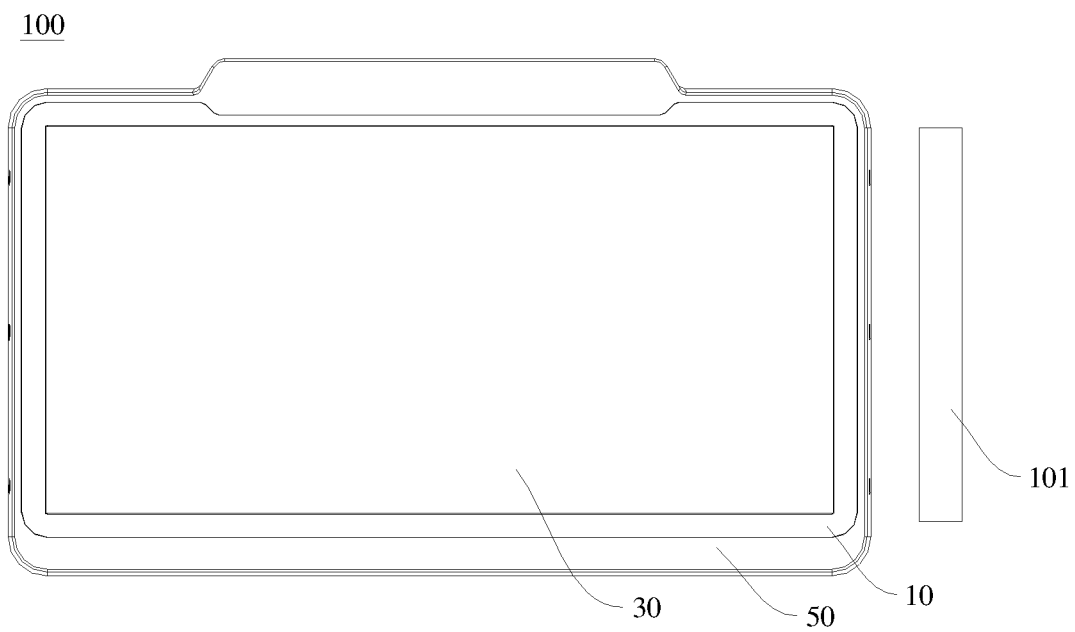
FIG. 2 illustrates a schematic structural diagram of the electronic tag device with electrophoretic display according to an embodiment of the disclosure.

In some embodiments, as shown in FIG. 2, the electronic tag device with electrophoretic display 100 further includes: a charging pile connector 101 detachably connected to a side of the electronic tag device with electrophoretic display 100 and configured to connect a charging pile to the electronic tag device with electrophoretic display 100. Specifically, the electronic tag device with electrophoretic display 100 may include a battery pack (not illustrated in figures) therein, the charging pile connector 101 is connected to the battery pack to charge the battery pack. The charging pile may be a cigarette lighter.

It should be noted that the disclosure does not limit the connection mode of the above elements, for example, they are connected by screws and nuts, or by adhesive.

Figure 6:
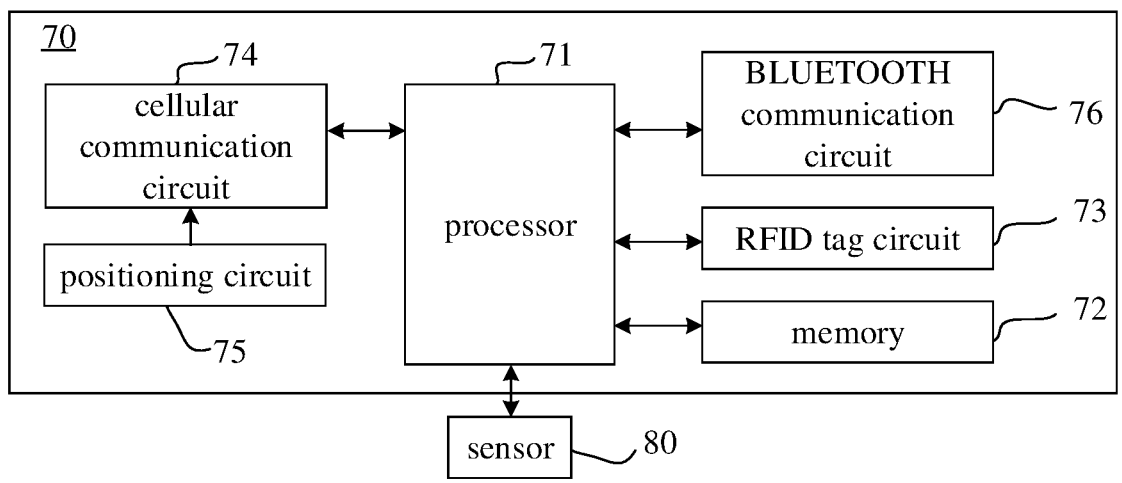
FIG. 6 illustrates a schematic block diagram of a circuit board according to an embodiment of the disclosure.

As shown in FIG. 6, the circuit board 70 is provided with a processor 71, a memory 72 connected to the processor 71, and a radio frequency identification (RFID) tag circuit 73 connected to the processor 71. The memory 72 may store multiple sets of tag data, and the processor 71 may select a target set of tag data from the multiple sets of tag data stored in the memory 72, and transmit the target set of tag data to the RFID tag circuit 73.

The processor 71 may be a microprocessor. The memory 72 may include a static random-access memory (SRAM) and a read-only memory (ROM). The RFID tag circuit 73 may be a RFID tag chip, and the RFID tag chip may be a Monza® X-8K tag chip.

In some embodiments, as shown in FIG. 1B, the circuit board 70 may include a first circuit board 701 and a second circuit board 702 which are separated from each other, the processor 71 and the memory 72 may be disposed on the first circuit board 701, and the RFID tag circuit 73 may be disposed on the second circuit board 702, that is, the RFID tag circuit 73 and the processor 71 are respectively located at two different circuit boards. Furthermore, the second installation area 512 of the middle frame 50 may include a first sub-installation area (not shown in the drawings) and a second sub-installation area (not shown in the drawings), and the second sub-installation area is located at a top of the first sub-installation area, the first sub-installation area is configured to install the first circuit board 701, and the second sub-installation area is configured to install the second circuit board 702. The middle frame 50 may further include a cover 55 configured to match with the outer frame 53 to cover the second circuit board 702.

In some embodiments, as shown in FIG. 6, the electronic tag device with electrophoretic display 100 further includes: a sensor 80, the sensor 80 is configured to monitor a temperature of the display screen 30 and send, in response to the temperature of the display screen 30 being greater than a target temperature, a control signal to the processor 71. The processor 71 is configured to turn on the heat sink 30 in response to the control signal.

In an illustrated embodiment, the sensor 80 may be disposed on a side of the display screen 30 and monitor the temperature of the display screen 30. The sensor 80 may be a thermal sensor, and includes a serial peripheral interface (SPI) interface. The target temperature can be preset by the user according to the actual situation. By configuring the sensor 80 to monitor the temperature of the display screen 30, a better display effect can be achieved.

In some embodiments, when the electronic tag device with electrophoretic display 100 is the digital license plate for the vehicle, as shown in FIG. 1A or FIG. 1B, the electronic tag device with electrophoretic display 100 further includes: a license plate holder 60 disposed on a side of the rear plate 90 facing away from the circuit board 70 and configured to fix to the vehicle. The license plate holder 60 can be set according to the actual needs of the vehicle.

When the electronic tag device with electrophoretic display 100 is the digital license plate for the vehicle, in some embodiments, the display screen 30 may display the target information including a first license plate number of the vehicle, the processor 71 may obtain a second license plate number from prestored license plate numbers and control the display screen 30 to display the second license plate number different from the first license plate number. That is, the electronic tag device with electrophoretic display 100 can achieve automatic updating of the license plate number, with simple and convenient operation, which can avoid the tedious operation of manually replacing the license plate when the geographical region of the vehicle has changed.

In some embodiments, as shown in FIG. 6, the circuit board 70 is further provided with a cellular communication circuit 74 connected to the processor 71, and a positioning circuit 75 connected to the cellular communication circuit 74.

Figure 7:
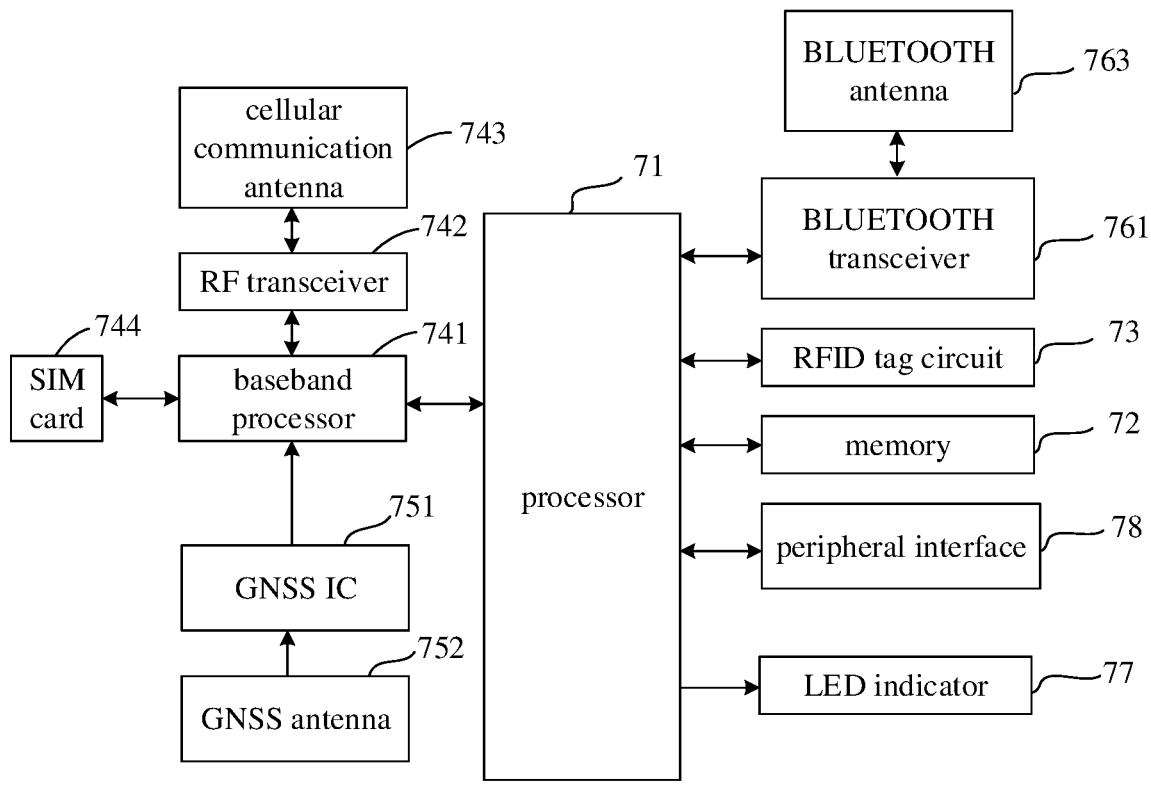
FIG. 7 illustrates a schematic block diagram of a circuit board according to an embodiment of the disclosure.

In an illustrated embodiment, as shown in FIG. 7, the cellular communication circuit 74 may include a baseband processor 741 connected to the processor 71 and a radio frequency (RF) transceiver 742 connected to the baseband processor 741. The positioning circuit 75 may be connected to the baseband processor 741. The baseband processor 741 may be provided with a SIM interface configured to connect a SIM card 744. The SIM card 744 may be a 4th generation communication system (4G) long term evolution (LTE) nano SIM card or other type cards such as 3G SIM card.

In addition, a cellular communication antenna 743 may be provided to connect the RF transceiver 742. The cellular communication antenna 743 can be integrated into the cellular communication circuit 74, or separated from the cellular communication circuit 74. The electronic tag device with electrophoretic display 100 having the cellular communication circuit 74 can obtain better communication effect in different environments.

The positioning circuit 75 supports at least one selected from the group consisting of a global positioning system (GPS), a BeiDou navigation satellite system (BDS), a Galileo satellite navigation system (GALILEO) and a global navigation satellite system (GLONASS).

In an illustrated embodiment, as shown in FIG. 7, the positioning circuit 75 may include: a global navigation satellite system (GNSS) integrated circuit (IC) 751 connected to the cellular communication circuit 74 and a GNSS antenna 752 connected to the GNSS IC 751. Specifically, the GNSS IC 751 is connected to the baseband processor 741 of the cellular communication circuit 74. For example, the GNSS IC 751 may be a GPS IC, and the GNSS antenna 752 may be a GPS antenna. For example, the GNSS IC 751 may be a chip with a model of UBX-M8.

In an illustrated embodiment, the GNSS antenna 752 may be integrated into the GNSS IC 751. In another illustrated embodiment, the positioning circuit 75 may include: a GNSS IC 751 including a GNSS antenna therein and a GNSS antenna 752 connected to the GNSS IC 751, that is, the positioning circuit 75 has two GNSS antennas.

The electronic tag device with electrophoretic display 100 having the positioning circuit 75 can obtain better positioning effect in different environments.

In some embodiments, the cellular communication circuit 74 and the positioning circuit 75 may be integrated in a single chip, for example, a cellular communication and positioning chip, the cellular communication and positioning chip may be a chip with a model of SARA-R510M8S.

In some embodiments, as shown in FIG. 6, the circuit board 70 is further provided with a BLUETOOTH communication circuit 76 connected to the processor 71.

In an illustrated embodiment, as shown in FIG. 7, the BLUETOOTH communication circuit 76 may include: a BLUETOOTH antenna 763 and a BLUETOOTH transceiver 761 connected to the BLUETOOTH antenna 763. The BLUETOOTH transceiver 761 may be connected with the processor 71.

In some embodiments, the BLUETOOTH communication circuit 76, the processor 71 and the memory 72 can be integrated in a single chip, for example, a system-on-chip (SoC) controller, the SoC controller may be a chip with a model of ESP32-C3.

In some embodiments, as shown in FIG. 7, the circuit board 70 is further provided with a LED indicator 77 connected to the processor 71. The LED indicator 77 can emit light of different colors for indicating different working states of the electronic tag device with electrophoretic display 100. For example, when the electronic tag device with electrophoretic display 100 is in a sleep mode, the LED indicator 77 may emit first color light, when the electronic tag device with electrophoretic display 100 is in a wake-up mode, the LED indicator 77 may emit second color light, when the electronic tag device with electrophoretic display 100 is in a start-up mode, the LED indicator 77 may emit third color light, or when the electronic tag device with electrophoretic display 100 is in a power off mode, the LED indicator 77 may emit fourth color light.

In some embodiments, the circuit board 70 is further provided with a peripheral interface 78 connected to the processor 71. The peripheral interface 78 may include a universal serial bus (USB) type-C interface configured to communicate with a personal computer (PC). Furthermore, the peripheral interface 78 may further include at least one of a general purpose input output (GPIO) interface, a serial peripheral interface (SPI) interface, a UART interface, an $I_2C$ interface and an $I_2S$ interface. The disclosure does not limit the specific type of the peripheral interface 78, and can be set according to the actual situation.

It is worth mentioning that the disclosure does not limit the specific composition of the aforementioned elements (e.g., cellular communication circuit 74, positioning circuit 75, and BLUETOOTH communication circuit 76), and other composition that can achieve the same functions are included in the disclosure.

The electronic tag device with electrophoretic display 100 has the multiple functions to adapt to different application scenes and meet the needs of users. In the following, the applications of the electronic tag device with electrophoretic display 100 are described in detail by way of examples with reference to FIG. 8.

Figure 8:
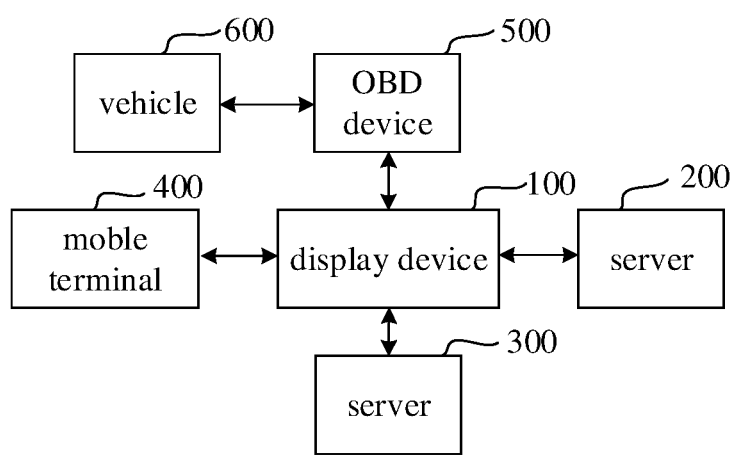
FIG. 8 illustrates a schematic diagram of an application scene of an electronic tag device with electrophoretic display according to an embodiment of the disclosure.

As shown in FIG. 8, the electronic tag device with electrophoretic display 100 may be individually connected to a server 200, a server 300, a mobile terminal 400 and an OBD device 500. Specifically, the electronic tag device with electrophoretic display 100 is connected to the server 200 through the cellular communication circuit 74, the electronic tag device with electrophoretic display 100 is connected to the server 300 through the RFID tag circuit 73, and the electronic tag device with electrophoretic display 100 is connected to the mobile terminal 400 and the OBD device 500 through the BLUETOOTH communication circuit 76.

The servers 200 and 300 each can be independent physical servers, or server clusters or distributed systems composed of multiple physical servers, or cloud servers or server clusters that provide cloud services, cloud databases, cloud computing, cloud functions, cloud storage, network services, cloud communications, middleware services, domain name services, security services, content delivery network (CDN), big data, artificial intelligence platforms and other basic cloud computing services. It should be noted that the disclosure does not limit the types and sources of the servers 200 and 300. The server 300 may be the same as the server 200 or different from the server 200.

The OBD device 500 may be a BLUETOOTH OBD device. The mobile terminal 400 can be a smart phone (such as a phone with android operation system, a phone with iPhone operation system (IOS), etc.), a tablet computer, a laptop, a mobile internet device (MID), a desktop computer, a smart appliance, a vehicle terminal (such as a vehicle navigation terminal, a vehicle computer, etc.), a smart watch, etc. It should be noted that the disclosure does not limit the specific type of the mobile terminal 400. For example, the mobile terminal 400 may be the smart phone of a user.

In the USA, every state regulates the license plates for vehicles in that state, the vehicle traveling across different geographical regions, such as the vehicle traveling across different states in the USA, needs to configure the corresponding license plate. Generally, the driver drives the vehicle across the different states, he needs to replace the license plate manually. For example, when the driver drives the vehicle from New Mexico to Texas, he needs to replace the license plate of New Mexico with the license plate of Texas manually, this operation is cumbersome.

Based on this, the electronic tag device with electrophoretic display 100 can be used as a digital license plate for a vehicle. The display screen 30 of the electronic tag device with electrophoretic display 100 may display a first license plate number of the vehicle 600, the processor 71 may obtain a second license plate number from prestored license plate numbers and control the display screen 30 to display the second license plate number different from the first license plate number. That is, the electronic tag device with electrophoretic display 100 can achieve automatic updating of the license plate number, with simple and convenient operation, which can avoid the tedious operation of manually replacing the license plate when the geographical region of the vehicle has changed.

With reference to FIG. 6 and FIG. 8, the positioning circuit 75 may obtain current positional data of the electronic tag device with electrophoretic display 100 and transmit the current positional data to the cellular communication circuit 74. The cellular communication circuit 74 may receive the current positional data, wirelessly transmit the current positional data to the server 200 to thereby enable the server 200 to output an information updating instruction in response to a current geographical region where the electronic tag device with electrophoretic display 100 is located determined by the current positional data is different from a previously determined geographical region, wirelessly receive the information updating instruction from the server 200, and transmit the information updating instruction to the processor 71. The processor 71 may obtain, in response to the information updating instruction, the second license plate number from the license plate numbers prestored in the memory 72 and control the display screen 30 to display the second license plate number corresponding to current geographical region.

In some embodiments, the cellular communication circuit 74 may receive the current positional data, encrypt the current positional data, and wirelessly transmit the encrypted current positional data to the server 200. The cellular communication circuit 74 may wirelessly receive the information updating instruction after being encrypted by the server 200, decrypt the received information updating instruction, and transmit the decrypted information updating instruction to the processor 71. That is, the cellular communication circuit 74 not only has communication function, but also has encryption and decryption functions, thus ensuring the security of data transmission.

In addition, at present, vehicles or license plates are often stolen. Based on this, the electronic tag device with electrophoretic display 100 can be used as a digital license plate for a vehicle, and the electronic tag device with electrophoretic display 100 can be controlled to display prompt information such as alarm information "being stolen", etc., or the electronic tag device with electrophoretic display can control the license plate number to flashing display, thereby reminding surrounding people that the vehicle or the license plate is abnormal.

Specifically, when a vehicle or a license plate is stolen, the owner can send control information to the server 200 through communication with the server 200, the server 200 sends the control instruction to the electronic tag device with electrophoretic display 100 based on the received control information, and the electronic tag device with electrophoretic display 100 controls the license plate number to flashing display based on the control instruction, thereby reminding surrounding people that the vehicle or license plate is abnormal.

With reference to FIG. 6 and FIG. 8, the cellular communication circuit 74 may receive a control instruction from the server 200 and transmit the control instruction to the processor 71, and the control instruction is generated by the server 200 based on control information output by the mobile terminal 400. The processor 71 may control, in response to the control instruction, the target information to flashing display. The target information may include license plate number.

In addition, the electronic tag device with electrophoretic display 100 can achieve contactless payment. Specifically, the display screen 30 may display the target information including a quick response (QR) code. By configuring the display screen 30 to display the QR code, the driver can achieve contactless payment.

At present, a non-stop electronic toll collection system is an advanced road toll collection system. In the USA, the vehicle traveling across different geographical regions, such as the vehicle traveling across different states in the USA, will encounter an additional expense for toll settlement in case of a tag device of the vehicle bound with only one account information, which has a great impact on some industries, such as the car leasing industry. Generally, the vehicle leasing is carried out at a fixed fee. When a leaseholder drives the vehicle across the different states, the vehicle will encounter the additional expense, which need to be borne by the vehicle leasing company itself. In this way, the revenue and development of the vehicle leasing company will be greatly affected. For example, a vehicle leasing company registers an account for the tag device in New Mexico, the tag device stores account information corresponding to New Mexico, the vehicle installed with the tag device will not encounter the additional expense when being driven in New Mexico, however, when the leaseholder drives the vehicle from New Mexico to Texas, in addition to a road toll, the vehicle will encounter an additional expense when the vehicle enters Texas caused by the tag device of the vehicle being bound with only the account information corresponding to the New Mexico, the additional expense can be understood as a handling fee incurred due to crossing different states, which greatly limits the development of the vehicle leasing industry.

Based on this, the electronic tag device with electrophoretic display 100 can be installed on a vehicle as a tag device, which can avoid the above additional expense. Specifically, with reference to FIGS. 6 and 8, the memory 72 stores the multiple sets of tag data corresponding to different geographical regions respectively, the positioning circuit 75 obtains the current positional data of the electronic tag device with electrophoretic display 100 in real time or periodically, i.e., the positioning circuit 75 obtains the current positional data of the vehicle 600 and transmits the current positional data to the cellular communication circuit 74, the cellular communication circuit 74 outputs the current positional data to the server 200 to enable the server 200 to output the tag data updating instruction when the geographical region, where the electronic tag device with electrophoretic display 100 is located, changes, i.e., when the vehicle travels cross the different geographical regions, the cellular communication circuit 74 receives the tag data updating instruction from the server 200 and transmits the tag data updating instruction to the processor 71, the processor 71 obtains the target set of tag data corresponding to the tag data updating instruction from the multiple sets of tag data and transmits the target set of tag data to the RFID tag circuit 73, the RFID tag circuit 73 updates a previous set of tag data to the target set of tag data to complete tag data updating. Therefore, when the vehicle is driven across the different geographical regions, no additional expense is incurred because non-local tag data (i.e., the previous set of tag data) has been replaced by local tag data (i.e., the target set of tag data). The electronic tag device with electrophoretic display 100 provided by the embodiment can be installed on the vehicle as the tag device to save the additional expense for toll settlement caused by the existing tag device of the vehicle being bound with only one account information, and it is conducive to the development of the vehicle leasing industry.

With reference to FIGS. 6 and 8, the positioning circuit 75 is configured to obtain current positional data of the electronic tag device with electrophoretic display 100 and transmit the current positional data to the cellular communication circuit 74; the cellular communication circuit 74 is configured to receive the current positional data, wirelessly transmit the current positional data to the server 200 to thereby enable the server 200 to output a tag data updating instruction in response to a current geographical region where the electronic tag device with electrophoretic display 100 is located determined by the current positional data is different from a previously determined geographical region, wirelessly receive the tag data updating instruction from the server 200, and transmit the tag data updating instruction to the processor 71; and the processor 71 is configured to obtain the target set of tag data corresponding to the tag data updating instruction from the multiple sets of tag data stored in the memory 72 and transmit the target set of tag data to the RFID tag circuit 73 for tag data updating.

In some embodiments, the cellular communication circuit 74 is specifically configured to: receive the current positional data, encrypt the current positional data, and wirelessly transmit the encrypted current positional data to the server 200; and the cellular communication circuit 74 is specifically configured to: wirelessly receive the tag data updating instruction after being encrypted by the server 200, decrypt the received tag data updating instruction, and transmit the decrypted tag data updating instruction to the processor 71.

In an illustrated embodiment, the previously determined geographical region may refer to a geographical region determined by immediately previous positional data, i.e., the previously determined geographical region may be an immediately previous determined geographical region. The current geographical region where the electronic tag device with electrophoretic display 100 is located determined by the current positional data is different from the previously determined geographical region, which can be understood that the geographical region, where the electronic tag device with electrophoretic display 100 is located, changes, i.e., the current positional data is not within a data range of the previously determined geographical region and is within a data range of the current geographical region.

In some embodiments, each set of the multiple sets of tag data includes: an electronic product code (EPC) and a tag identifier (TID).

In some embodiments, the TIDs of the multiple sets of tag data include multiple account information corresponding to different geographical regions respectively, and the TID of the target set of tag data includes one of the multiple account information corresponding to the current geographical region being one of the different geographical regions.

The different geographical regions may be different administrative regions, such as different states in the United States of America (USA). The TID of the target set of tag data may include one of the multiple account information corresponding to the current geographical region being one of the different geographical regions.

Specifically, the multiple account information corresponding to different geographical regions can be understood that the user registers accounts in the different geographical regions respectively to store the multiple account information of the geographical regions in the memory 72.

For example, when the RFID tag circuit 73 of the electronic tag device with electrophoretic display 100 stores the account information of the geographical region A, a vehicle installed with the electronic tag device with electrophoretic display 100 is driven in the geographical region A, as the RFID tag circuit 73 stores local tag data of the geographical region A, no additional cost is incurred. When the vehicle 600 is driven from the geographical regions A to B, the RFID tag circuit 73 of the electronic tag device with electrophoretic display 100 can update the account information of the geographical region A to the account information of the geographical region B, at this time, as the RFID tag circuit 73 stores local tag data of the geographical region B, and there is no the additional expense.

The electronic tag device with electrophoretic display 100 can communicate with the vehicle 600 and the mobile terminal 400 through the BLUETOOTH communication circuit 76. The BLUETOOTH communication circuit 76 has a first mode and a second mode. As shown in FIG. 6 and FIG. 8, the BLUETOOTH communication circuit 76 is configured to wirelessly connect the OBD device 500 connected to the vehicle 600 in the first mode, and to wirelessly connect the mobile terminal 400 in the second mode. For example, the first mode of the BLUETOOTH communication circuit 76 may be a master device mode, and the second mode of the BLUETOOTH communication circuit 76 may be a slave device mode.

With the global warming, issues related to carbon emissions, mainly carbon dioxide emissions, are increasingly concerned. The amount of carbon dioxide in automobile exhaust gas accounts for nearly a quarter of the total carbon dioxide emission. With the increase of vehicle ownership, the carbon dioxide emissions will also increase, thus it is necessary to detect and monitor the carbon emissions of vehicles, so that the traffic management department or environmental protection department can evaluate the implementation effect of traffic energy conservation and emission reduction measures, or find vehicles with excessive carbon emissions in the traffic system for supervision and management.

Based on this, the electronic tag device with electrophoretic display 100 can obtain OBD data from the vehicle 600. Specifically, the processor 71 of the electronic tag device with electrophoretic display 100 may transmit an OBD data request command set to the BLUETOOTH communication circuit 76, and the BLUETOOTH communication circuit 76 may transmit the OBD data request command set to the vehicle 600 through the OBD device 500, thereby to obtain the OBD data from the vehicle 600. The processor 71 may obtain and convert the first target OBD data based on the OBD data obtained from the BLUETOOTH communication circuit 76, the RFID tag circuit 73 stores the converted first target OBD data meeting the ISO18000-6C, and the server 300 obtains the converted first target OBD data meeting the ISO18000-6C through the RFID tag circuit 73. The server 300 may be the authenticated electronic toll collection system (ETC) server, and the converted first target OBD data meeting the ISO18000-6C may include vehicle exhaust data. The authenticated ETC server can obtain the vehicle exhaust data meeting the ISO18000-6C from the RFID tag circuit 73, it is convenient for relevant departments such as traffic management department or environmental protection department to monitor the carbon emissions of vehicles and thus it is beneficial for the relevant departments to manage vehicles. As a result, the traffic management department or environmental protection department can evaluate the implementation effect of traffic energy conservation and emission reduction measures, and find out vehicles with excessive carbon emissions in the traffic system for supervision and management.

It should be noted that the server 300 obtains the data from the RFID tag circuit 73, which can be understood as indirect communication, i.e., a RFID tag reader is disposed on where needed, and the RFID tag reader can obtain the data from the RFID tag circuit 73 and sends it to the server 300.

In some embodiments, the processor 71 is configured to transmit an OBD data request command set to the BLUETOOTH communication circuit 76; the BLUETOOTH communication circuit 76 is configured to output, in the first mode, the OBD data request command set to the vehicle 600 through the OBD device 500, to thereby enable the vehicle 600 to output OBD data in response to the OBD data request command set; and the processor 71 is further configured to obtain first target OBD data based on the OBD data obtained from the OBD device 500 through the BLUETOOTH communication circuit 76 and convert a data format of the first target OBD data to obtain converted first target OBD data meeting ISO18000-6C; and the RFID tag circuit 73 is configured to obtain and store the converted first target OBD data meeting ISO18000-6C from the processor 71 to thereby allow the server 300 to obtain the converted first target OBD data meeting ISO18000-6C from the RFID tag circuit 73.

In some embodiments, the OBD data may include: vehicle basic parameters, vehicle exhaust emission parameters, vehicle fault diagnosis data, and/or vehicle control data. The vehicle basic parameters may include: current data of powertrain, VIN, and CID. The vehicle exhaust emission parameters may include: oxygen sensor test data, catalyst test data, and VVT test data. The vehicle fault diagnosis data may include: freeze frame data, and confirmed DTC. The current data of powertrain include, but be not limited to, engine coolant temperature, fuel control system status, fuel correction, ignition timing advance, intake air temperature, manifold air pressure, air flow, engine speed, throttle position sensor output values, secondary air status, calculated load value, vehicle speed, and fuel pressure. The freeze frame data, i.e., stored engine status data at the time of failure, may include, but be not limited to, calculated load value, engine speed, fuel correction value, fuel pressure, vehicle speed, coolant temperature, intake branch pipe pressure, closed loop or open loop operation status, and fault codes that cause the above data to be stored. In an embodiment, the OBD data meet the second on-board diagnostics (OBD II) standard.

In an illustrated embodiment, the processor 71 is specifically configured to select at least some of the OBD data as the first target OBD data. In another illustrated embodiment, the processor 71 is specifically configured to calculate the first target OBD data based on at least some of the OBD data. The processor 71 can output the obtained OBD data directly as the first target OBD data, or calculate the first target OBD data based on the OBD data, so as to meet the needs of different OBD data in different scenes.

In addition, at present, there is a problem that automobile drivers e.g., truck drivers steal gasoline in logistics companies. That is, after driving out, truck drivers will stop halfway to steal gasoline from trucks. Because logistics companies have no way to monitor the use of gasoline, they cannot judge whether truck drivers steal gasoline, which leads to an increase in the company's operating costs.

Based on this, the processor 71 of the electronic tag device with electrophoretic display 100 may obtain second target OBD data from the vehicle 600 and transmit the second target OBD data to the cellular communication circuit 74, to thereby allow the server 200 to obtain the second target OBD data from the cellular communication circuit 74.

The second target OBD data may include the vehicle basic parameters such as a fuel consumption, a driving distance, an odometer data, and a fuel tank level. When the truck driver drives the truck disposed with the electronic tag device with electrophoretic display 100, the logistics company can know the driving conditions of the truck, for example, the logistics company can know the driving conditions of the truck through communicating with the server 200, and thus it can determine whether the truck driver steal gasoline, thereby avoiding the problem of the truck driver stealing gasoline, and the transportation cost of the logistics company can be reduced.

In some embodiments, the processor 71 is further configured to obtain second target OBD data based on the OBD data, and transmit the second target OBD data to the cellular communication circuit 74 to thereby allow the server 200 to obtain the second target OBD data from the cellular communication circuit 74.

In an illustrated embodiment, the processor 71 is specifically configured to select at least some of the OBD data as the second target OBD data, or the processor 71 is specifically configured to calculate the second target OBD data based on at least some of the OBD data. The second target OBD data may be the same as the first target OBD data or different from the first target OBD data.

In some embodiments, the cellular communication circuit 74 is specifically configured to receive the second target OBD data, encrypt the second target OBD data, and wirelessly transmit the encrypted second target OBD data to the server 200. The encrypted transmission of second target OBD data is realized, and the security of data transmission is ensured.

In some embodiments, the processor 71 may output different target OBD data to the RFID tag circuit 73 and the cellular communication circuit 74. In an illustrated embodiment, the processor 71 may obtain different target OBD data based on different OBD data, and then output different target OBD data to the RFID tag circuit 73 and the cellular communication circuit 74. In another illustrated embodiment, the processor 71 may obtain different target OBD data based on the same OBD data, and then output different target OBD data to the RFID tag circuit 73 and the cellular communication circuit 74.

In some embodiments, the processor 71 may output the same target OBD data to the RFID tag circuit 73 and the cellular communication circuit 74.

At present, it is very complicated for vehicle maintenance personnel to obtain vehicle data. Based on this, the processor 71 of the electronic tag device with electrophoretic display 100 may obtain third target OBD data based on the OBD data and transmit the third target OBD data to the BLUETOOTH communication circuit 76, and the mobile terminal 400 can obtain the third target OBD data. Thus, the vehicle maintenance personnel can directly obtain the vehicle fault diagnosis data for vehicle fault diagnosis and vehicle maintenance, the operation of obtaining data is simple and efficient.

In some embodiments, the processor 71 is further configured to obtain third target OBD data based on the OBD data, and transmit the third target OBD data to the BLUETOOTH communication circuit 76 to thereby allow the mobile terminal 400 to obtain the third target OBD data from the BLUETOOTH communication circuit 76 in the second mode for user viewing.

In an illustrated embodiment, the processor 71 is specifically configured to select at least some of the OBD data as the third target OBD data, or the processor 71 is specifically configured to calculate the third target OBD data based on at least some of the OBD data.

In some embodiments, the BLUETOOTH communication circuit 76 is specifically configured to receive the third target OBD data, encrypt the third target OBD data, and wirelessly transmit the encrypted third target OBD data to the mobile terminal 400. In addition to the communication function, the BLUETOOTH communication circuit 76 further has the data encryption function, which ensures the security of data transmission.

In some embodiments, the processor 71 may output different target OBD data to the RFID tag circuit 73, the cellular communication circuit 74, and the BLUETOOTH communication circuit 76. In an illustrated embodiment, the processor 71 may obtain different target OBD data based on different OBD data, and then output different target OBD data to the RFID tag circuit 73, the cellular communication circuit 74, and the BLUETOOTH communication circuit 76. In another illustrated embodiment, the processor 71 may obtain different target OBD data based on the same OBD data, and then output different target OBD data to the RFID tag circuit 73, the cellular communication circuit 74, and the BLUETOOTH communication circuit 76.

In some embodiments, the processor 71 may output the same target OBD data to the RFID tag circuit 73, the cellular communication circuit 74, and the BLUETOOTH communication circuit 76.

Moreover, in some embodiments, the above OBD data can be obtained by the following methods.

In a first method, the memory 72 may store multiple OBD data request commands, the processor 71 may select at least one OBD data request command from the multiple OBD data request commands stored in the memory 72 to form the OBD data request command set and transmit the OBD data request command set to the BLUETOOTH communication circuit 76. The BLUETOOTH communication circuit 76 may output, in the first mode, the OBD data request command set to the OBD device 500 to thereby enable the vehicle 600 connected to the OBD device 500 to output the OBD data in response to the OBD data request command set.

In a second method, the memory 72 may store multiple OBD data request command sets, the processor 71 may select the OBD data request command set from the multiple OBD data request command sets stored in the memory 72 and transmit the OBD data request command set to the BLUETOOTH communication circuit 76, the BLUETOOTH communication circuit 76 may output, in the first mode, the OBD data request command set to the OBD device 500 to thereby enable the vehicle 600 connected to the OBD device 500 to output the OBD data in response to the OBD data request command set.

It is worth mentioning here that the aforementioned embodiments are illustrated by the external OBD device 500. In practical applications, the OBD device 500 may be built-in in the electronic tag device with electrophoretic display 100. In some embodiments, the processor 71 may communicate with the built-in OBD device directly to obtain the OBD data, or the processor 71 may communicate with the built-in OBD device through the BLUETOOTH communication circuit 76 to obtain the OBD data. For example, when the OBD device 500 is built-in in the electronic tag device with electrophoretic display 100, the OBD device 500 may include a CAN (abbreviation for Controller Area Network) to UART (abbreviation for Universal Asynchronous Receiver/Transmitter) converter connected to the processor 71 and configured to connect the OBD interface of the vehicle, and the CAN to UART converter can perform data format conversion, it is convenient for the electronic tag device with electrophoretic display 100 to communicate with the vehicle 600.

In some embodiment, the BLUETOOTH communication circuit 76 may receive BLUETOOTH data from the mobile terminal 400, convert the BLUETOOTH data to obtain converted BLUETOOTH data, and transmit the converted BLUETOOTH data to the processor 71. The processor 71 can store the converted BLUETOOTH data into the memory 72.

In some embodiments, the processor 71 may obtain data to be displayed from the memory 72, and transmit the data to be displayed to the BLUETOOTH communication circuit 76. The BLUETOOTH communication circuit 76 may receive the data to be displayed, convert the data to be displayed and then output the converted data to be displayed to the mobile terminal 400 for user viewing.

The electronic tag device with electrophoretic display 100 communicates with the mobile terminal 400 through the BLUETOOTH communication circuit 76, which can transmit the data that the user needs to view to the mobile terminal 400 through the BLUETOOTH communication circuit 76 and store new data into the electronic tag device with electrophoretic display 100 through the BLUETOOTH communication circuit 76, it is convenient for the user to understand relevant information of the electronic tag device with electrophoretic display 100 and to operate the electronic tag device with electrophoretic display 100.

In summary, the electronic tag device with electrophoretic display 100 can be used not only as a tag device, but also as a digital license plate. As the digital license plate, its display screen 30 can display a variety of information and realize information update, which enriches the functions of the existing license plate. In addition, as the tag device, the electronic tag device with electrophoretic display 100 enriches the functions of the existing tag device and is suitable for various application scenes. The electronic tag device with electrophoretic display 100 can meet the needs of different users.

The above are only some of the embodiments of the disclosure, which does not limit a scope of the patent of the disclosure. Without departing from the spirit and scope of the disclosure, the disclosure will also have various changes and improvements. Under the disclosure concept of the disclosure, the equivalent structural transformation made by using the description and attached drawings of the disclosure, directly or indirectly applied in other relevant technical fields, are included in the scope of patent protection of the disclosure.

What is claimed is:

1. An electronic tag device with electrophoretic display, comprising:
a front frame;
a display screen, disposed on a side of the front frame;
a middle frame, disposed on a side of the display screen facing away from the front frame;
a circuit board, disposed on a side of the middle frame facing away from the display screen; and
a rear frame, disposed on a side of the circuit board facing away from the middle frame;
wherein the display screen is configured to display target information under a control of the circuit board; and
wherein the circuit board is provided with a processor, a memory connected to the processor, and a radio frequency identification (RFID) tag circuit connected to the processor; the memory stores multiple sets of tag data, and the processor is configured to select a target set of tag data from the multiple sets of tag data stored in the memory, and transmit the target set of tag data to the RFID tag circuit;
wherein the electronic tag device with electrophoretic display further comprises:
a heater, disposed between the display screen and the middle plate; and
a heat sink, disposed between the heater and the middle plate;
wherein the electronic tag device with electrophoretic display further comprises: a sensor, configured to monitor a temperature of the display screen and send, in response to the temperature of the display screen being greater than a target temperature, a control signal to the processor; and
wherein the processor is configured to turn on the heat sink in response to the control signal.

2. The electronic tag device with electrophoretic display as claimed in claim 1, wherein the electronic tag device with electrophoretic display is a digital license plate for a vehicle, and the target information comprises alphanumeric characters.

3. The electronic tag device with electrophoretic display as claimed in claim 2, wherein the electronic tag device with electrophoretic display further comprises: a license plate holder disposed on a side of the rear plate facing away from the circuit board and configured to fix to the vehicle.

4. The electronic tag device with electrophoretic display as claimed in claim 2, wherein the display screen is configured to display the target information including a first license plate number of the vehicle; and
wherein the processor is configured to obtain a second license plate number from prestored license plate numbers and control the display screen to display the second license plate number different from the first license plate number.

5. The electronic tag device with electrophoretic display as claimed in claim 4, wherein the circuit board is further provided with a cellular communication circuit connected to the processor, and a positioning circuit connected to the cellular communication circuit;
wherein the positioning circuit is configured to obtain current positional data of the electronic tag device with electrophoretic display and transmit the current positional data to the cellular communication circuit;
wherein the cellular communication circuit is configured to receive the current positional data, wirelessly transmit the current positional data to a server to thereby enable the server to output an information updating instruction in response to a current geographical region where the electronic tag device with electrophoretic display is located determined by the current positional data is different from a previously determined geographical region, wirelessly receive the information updating instruction from the server, and transmit the information updating instruction to the processor; and
wherein the processor is configured to obtain, in response to the information updating instruction, the second license plate number from the prestored license plate numbers and control the display screen to display the second license plate number corresponding to current geographical region.

6. The electronic tag device with electrophoretic display as claimed in claim 2, wherein the circuit board is further provided with a cellular communication circuit connected to the processor;
wherein the cellular communication circuit is configured to receive a control instruction from a server and transmit the control instruction to the processor; and the control instruction is generated by the server based on control information output by a mobile terminal; and
wherein the processor is configured to control, in response to the control instruction, the target information to flashing display.

7. The electronic tag device with electrophoretic display as claimed in claim 1, wherein the display screen is specifically configured to display the target information including a quick response (QR) code.

8. The electronic tag device with electrophoretic display as claimed in claim 1, wherein the electronic tag device with electrophoretic display further comprises: a charging pile connector, detachably connected to a side of the electronic tag device with electrophoretic display and configured to connect a charging pile to the electronic tag device with electrophoretic display.

9. The electronic tag device with electrophoretic display as claimed in claim 1, wherein the circuit board is further provided with a cellular communication circuit connected to the processor, and a positioning circuit connected to the cellular communication circuit;
wherein the positioning circuit is configured to obtain current positional data of the electronic tag device with electrophoretic display and transmit the current positional data to the cellular communication circuit;
wherein the cellular communication circuit is configured to receive the current positional data, wirelessly transmit the current positional data to a server to thereby enable the server to output a tag data updating instruction in response to a current geographical region where the electronic tag device with electrophoretic display is located determined by the current positional data is different from a previously determined geographical region, wirelessly receive the tag data updating instruction from the server, and transmit the tag data updating instruction to the processor; and
wherein the processor is configured to obtain the target set of tag data corresponding to the tag data updating instruction from the multiple sets of tag data stored in the memory and transmit the target set of tag data to the RFID tag circuit for tag data updating.

10. The electronic tag, device with electrophoretic display according to claim 9, wherein the cellular communication circuit is specifically configured to: receive the current positional data, encrypt the current positional data, and wirelessly transmit the encrypted current positional data to the server; and wherein the cellular communication circuit is specifically configured to: wirelessly receive the tag data updating instruction after being encrypted by the server, decrypt the received tag data updating instruction, and transmit the decrypted tag data updating instruction to the processor.

11. The electronic tag device with electrophoretic display according to claim 9, wherein each set of the multiple sets of tag data comprises: an electronic product code (EPC) and a tag identifier (TID).

12. The electronic tag device with electrophoretic display according to claim 11, wherein the TIDs of the multiple sets of tag data comprise multiple account information corresponding to different geographical regions respectively, and the TID of the target set of tag data comprises one of the multiple account information corresponding to the current geographical region being one of the different geographical regions.

13. The electronic tag device with electrophoretic display according to claim 1, wherein the circuit board is further provided with a BLUETOOTH communication circuit connected to the processor; and wherein the BLUETOOTH communication circuit has a first mode and a second mode; and the BLUETOOTH communication circuit is configured to wirelessly connect an OBD device connected to a vehicle in the first mode, and to wirelessly connect a mobile terminal in the second mode.

14. The electronic tag device with electrophoretic display according to claim 13, wherein the processor is configured to transmit an OBD data request command set to the BLUETOOTH communication circuit; the BLUETOOTH communication circuit is configured to output, in the first mode, the OBD data request command set to the vehicle through the OBD device, to thereby enable the vehicle to output OBD data in response to the OBD data request command set;

wherein the processor is further configured to obtain first target OBD data based on the OBD data obtained from the OBD device through the BLUETOOTH communication circuit and convert a data format of the first target OBD data to obtain converted first target OBD data meeting ISO18000-6C; and wherein the RFID tag circuit is configured to obtain and store the converted first target OBD data meeting ISO18000-6C from the processor to thereby allow a first server to obtain the converted first target OBD data meeting ISO18000-6C from the RFID tag circuit.

15. The electronic tag device with electrophoretic display according to claim 14, wherein the OBD data comprises: static data including vehicle identification number (VIN), and dynamic data including at least one of a fuel tank level, odometer data and vehicle exhaust emission parameters.

16. The electronic tag device with electrophoretic display as claimed in claim 14, wherein the circuit board is further provided with a cellular communication circuit connected to the processor and configured to wirelessly connect a second server; and wherein the processor is further configured to obtain second target OBD data based on the OBD data, and transmit the second target OBD data to the cellular communication circuit to thereby allow the second server to obtain the second target OBD data from the cellular communication circuit.

17. The electronic tag device with electrophoretic display as claimed in claim 16, wherein the processor is further configured to obtain third target OBD data based on the OBD data, and transmit the third target OBD data to the BLUETOOTH communication circuit to thereby allow the mobile terminal to obtain the third target OBD data from the BLUETOOTH communication circuit in the second mode for user viewing.

18. The electronic tag device with electrophoretic display according to claim 13, wherein the processor is configured to obtain data to be displayed from the memory, and transmit the data to be displayed to the BLUETOOTH communication circuit; and the BLUETOOTH communication circuit is configured to receive the data to be displayed, convert the data to be displayed and then output, in the second mode, the converted data to be displayed to the mobile terminal for user viewing.

19. An electronic tag device with electrophoretic display, comprising:
a front frame;
a display screen, disposed on a side of the front frame;
a middle frame, disposed on a side of the display screen facing away from the front frame;
a circuit board, disposed on a side of the middle frame facing away from the display screen; and
a rear frame, disposed on a side of the circuit board facing away from the middle frame;
wherein the display screen is configured to display target information under a control of the circuit board; and
wherein the circuit board is provided with a processor, a memory connected to the processor, and a RFID tag circuit connected to the processor; the memory stores multiple sets of tag data, and the processor is configured to select a target set of tag data from the multiple sets of tag data stored in the memory, and transmit the target set of tag data to the RFID tag circuit;
wherein the circuit board is further provided with a BLUETOOTH communication circuit connected to the processor; and
wherein the BLUETOOTH communication circuit has a first mode and a second mode; and the BLUETOOTH communication circuit is configured to wirelessly connect an OBD device connected to a vehicle in the first mode, and to wirelessly connect a mobile terminal in the second mode.

20. An electronic tag device with electrophoretic display, comprising:
a front frame;
a display screen, disposed on a side of the front frame;
a middle frame, disposed on a side of the display screen facing away from the front frame;
a circuit board, disposed on a side of the middle frame facing away from the display screen; and
a rear frame, disposed on a side of the circuit board facing away from the middle frame;
wherein the display screen is configured to display target information under a control of the circuit board; and
wherein the circuit board is provided with a processor, a memory connected to the processor, and a RFID tag circuit connected to the processor; the memory stores multiple sets of tag data, and the processor is configured to select a target set of tag data from the multiple sets of tag data stored in the memory, and transmit the target set of tag data to the RFID tag circuit;
wherein the circuit board is further provided with a cellular communication circuit connected to the processor, and a positioning circuit connected to the cellular communication circuit;
wherein the positioning circuit is configured to obtain current positional data of the electronic tag device with electrophoretic display and transmit the current positional data to the cellular communication circuit;

wherein the cellular communication circuit is configured to receive the current positional data, wirelessly transmit the current positional data to a server to thereby enable the server to output a tag data updating instruction in response to a current geographical region where the electronic tag device with electrophoretic display is located determined by the current positional data is different from a previously determined geographical region, wirelessly receive the tag data updating instruction from the server, and transmit the tag data updating instruction to the processor; and wherein the processor is configured to obtain the target set of tag data corresponding to the tag data updating instruction from the multiple sets of tag data stored in the memory and transmit the target set of tag data to the RFID tag circuit for tag data updating;

wherein each set of the multiple sets of tag data comprises: an EPC and a TID;

wherein the TIDs of the multiple sets of tag data comprise multiple account information corresponding to different geographical regions respectively, and the TID of the target set of tag data comprises one of the multiple account information corresponding to the current geographical region being one of the different geographical regions.

* * * * *